Aug. 9, 1955  E. BEHNKE  2,714,913
ANTI-SKID DEVICE

Filed Sept. 23, 1953  2 Sheets-Sheet 1

INVENTOR
EVERETT BEHNKE

BY
Young & Wright
ATTORNEYS

Aug. 9, 1955

E. BEHNKE 2,714,913

ANTI-SKID DEVICE

Filed Sept. 23, 1953

INVENTOR
EVERETT BEHNKE

BY

*Morris Wright*

ATTORNEYS

United States Patent Office 2,714,913
Patented Aug. 9, 1955

2,714,913
ANTI-SKID DEVICE
Everett Behnke, Manitowoc, Wis.

Application September 23, 1953, Serial No. 381,789

1 Claim. (Cl. 152—213)

This invention pertains to anti-skid devices and more particularly to new and useful improvements in anti-skid chains for the wheels of automobiles and other self-propelled vehicles.

In the past, great difficulty has been encountered in applying anti-skid chains to the tires or wheels of automotive vehicles; as it was usually necessary to either jack up the automotive vehicle, or to roll the tire or wheel onto the chain.

Attempts have been made to develop anti-skid devices which can be mounted on the tire or wheel without the need to jack up the wheel, but invariably these prior devices were too cumbersome, difficult to apply, and utilized complicated locking or fastening mechanisms.

Therefore, a primary object of my present invention is to provide an anti-skid device or tire chain of a rather simple construction and one which can be easily placed on a wheel without jacking up the same.

Another important object of my invention resides in the provision of a tire chain which has a quick and easily operated fastening means.

Still another object of my invention is to provide my anti-skid chain with a further simple adjustment in front of the tire for tightening the chains to the tire or wheel to insure effective traction and quiet operation of my anti-skid device.

A further object of my invention is to provide a simple, practical and reliable construction that is economical to manufacture, easy to assemble, and positive in its operation.

With the above and other objects in view which will more readily appear as the nature of the invention is better understood, the same consists in the novel construction, combination, and arrangement of parts hereinafter more fully described, illustrated, and claimed.

A preferred and practical embodiment of my invention is shown in the accompanying drawings in which.

Referring now to the drawings in detail wherein similar reference characters designate corresponding parts throughout the several views, the letter "C" generally indicates my new and novel anti-skid device and the same is shown applied to a conventional wheel or tire "T."

Figure 1:
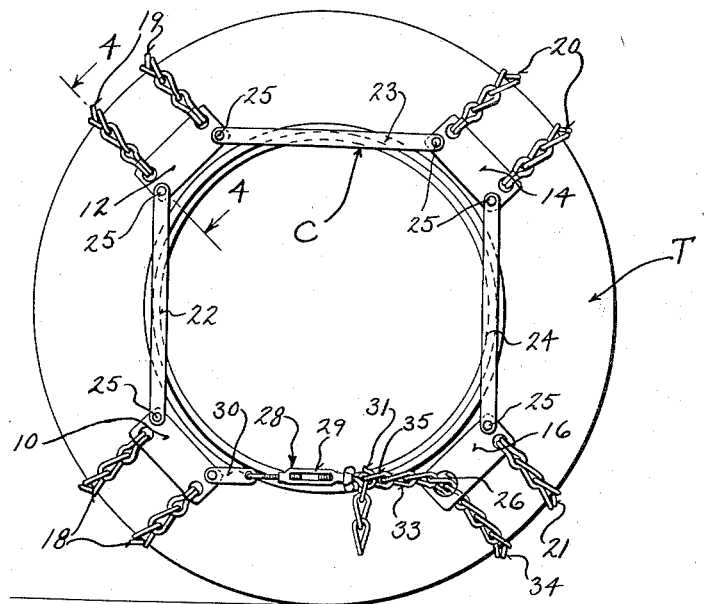
Figure 1 is an outer face view of my novel anti-skid tire chain shown operatively applied to a vehicle tire or wheel.
Figure 2:
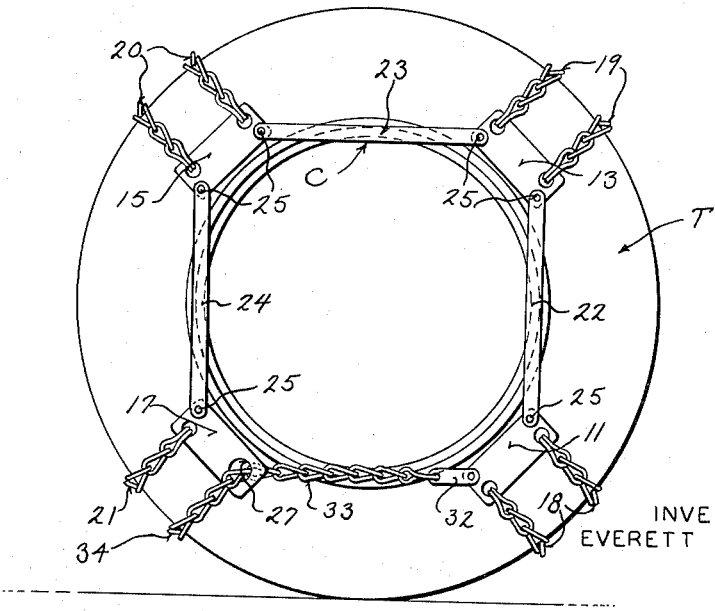
Figure 2 is an inner face view of my novel anti-skid chain shown in the operative position of Figure 1 of the drawings.

My anti-skid chain "C" includes broadly, a series of tread chain receiving plates 10, 11; 12, 13; 14, 15; and 16, 17; arranged in pairs and to which are fastened the respective tread chains 18, 18; 19, 19; 20, 20; and 21, respectively. Each pair of plates is united to the next adjacent pair by pairs of links 22, 23, and 24, respectively, with each link being pivotally connected to a respective lower end corner of each plate as indicated by the reference numeral 25. However, the pairs of plates 10, 11; and 16, 17 are not pivotally linked together but are detachably joined by my novel fastening device 28. For this purpose, one pair of the tread chain receiving plates 16 and 17 are provided with aligned openings 26 and 27, respectively, and it is to be noted that this particular pair of plates carries only one tread chain 21. Plate 10, in turn, carries an adjustable turnbuckle 29, which turnbuckle is pivotally connected to the plate by means of the link 30 at one end and is provided with a hook 31 on its other end. Similarly secured to the plate 11 by means of a link 32, is an elongated length of chain 33, a portion of which 34 (see in particular Figures 1 and 2) is utilized as a tread chain and it will be noted that the elongated length 33 is received through the respective openings 26 and 27 and one link is received over the hook 31 of the turnbuckle 29.

Figure 3:
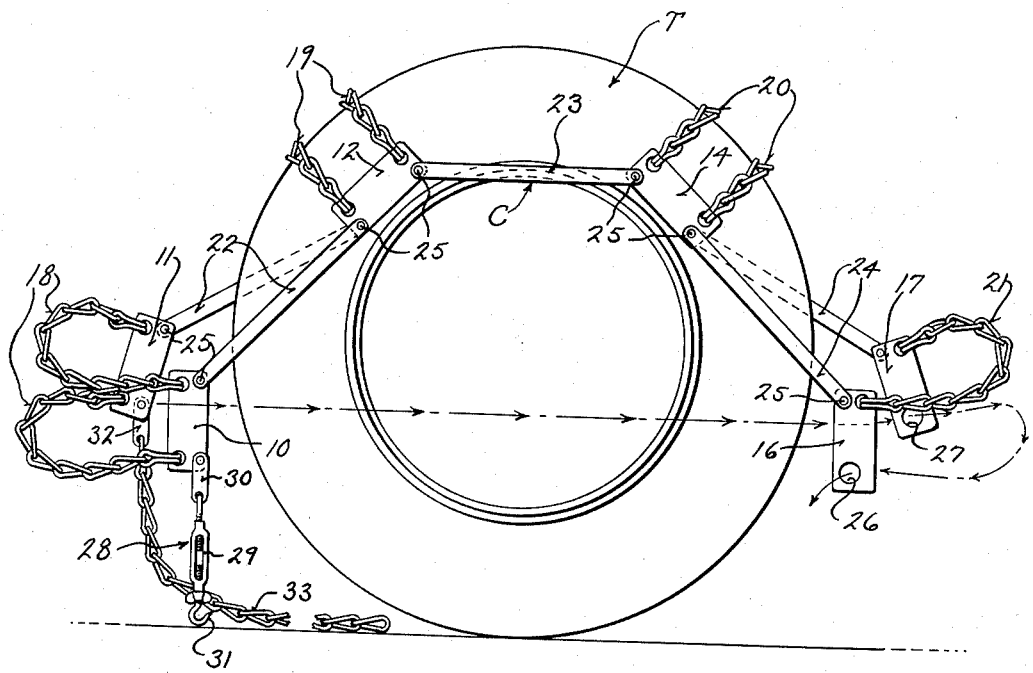
Figure 3 illustrates a side elevational view of the tire or wheel similar to Figures 1 and 2 of the drawings, but illustrating diagrammatically the manner in which my tire chain is applied to the tire or wheel.
Figure 4:
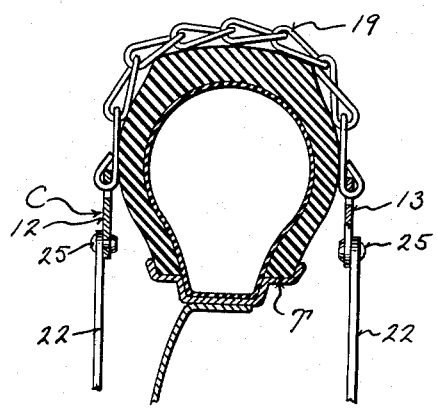
Figure 4 is a transverse sectional view through the tire and my novel anti-skid device taken on the line 4—4 of Figure 1 and looking in the direction of the arrows.

To secure my quickly attachable anti-skid device "C" to the tire "T" it is merely necessary to lay the respective pairs of plates 12, 13; and 14, 15 along the sides of the tire "T" at the top portion thereof as shown in Figure 3 of the drawings. The plates 10 and 11 are then fitted to the lower portion of the tire and chain 33 is moved in the direction of the arrows, threaded through the respective openings 27 and 26 in plates 17 and 16, respectively, and pulled tight where the link 35 is received on the hook 31. My chain is now in its operative position illustrated in Figures 1 and 2 of the drawings. A further adjustment may be had by manipulating the turnbuckle 29, until the chains are tight on the tire. This will eliminate the slapping of the chains and provide a quieter running device. In order to remove my anti-skid chain, it is merely necessary to reverse the procedure outlined above.

While I have shown and described a preferred form of my invention, it will be understood that minor changes in construction may be made from time to time without departing from the spirit of the invention or the scope of the appended claim.

I claim:

An anti-skid device, constructed and arranged to be attached to a tire from one side only, comprising, a plurality of cross tread chains, a plurality of cross tread chain receiving plates, said plates being arranged in pairs with a plate of each pair lying on the opposite side of the tire from its respective plate in the pair, pairs of links pivotally connecting the pairs of plates together with one end pair of plates being free from the next adjacent pair of plates, said end pair of plates being provided with aligned apertures, an elongated chain pivotally secured to one of said plates in the next adjacent pair, and a hook pivotally secured to the other plate, said elongated chain in one position threaded through the aligned apertures of one end pair of plates and a link received over the hook in the plate of the next adjacent pair, whereby a portion of said elongated chain acts as a cross tread chain.

References Cited in the file of this patent

UNITED STATES PATENTS

| | | |
|---|---|---|
| 2,074,616 | Martel | Mar. 23, 1937 |
| 2,176,631 | Kunkle | Oct. 17, 1939 |
| 2,562,798 | Kovatch | July 31, 1951 |
| 2,582,193 | Dowell | Jan. 8, 1952 |